US012638295B2

(12) United States Patent
Nagata et al.

(10) Patent No.: US 12,638,295 B2
(45) Date of Patent: May 26, 2026

(54) INFORMATION PROCESSING DEVICE AND INFORMATION PROCESSING SYSTEM

(71) Applicant: TOYOTA JIDOSHA KABUSHIKI KAISHA, Toyota (JP)

(72) Inventors: Yu Nagata, Chofu (JP); Toshihiro Nakamura, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 531 days.

(21) Appl. No.: 18/314,262

(22) Filed: May 9, 2023

(65) Prior Publication Data

US 2023/0366683 A1 Nov. 16, 2023

(30) Foreign Application Priority Data

May 13, 2022 (JP) ................................. 2022-079237

(51) Int. Cl.
*G01C 21/30* (2006.01)
*B60W 60/00* (2020.01)
*G01C 21/00* (2006.01)

(52) U.S. Cl.
CPC ........... *G01C 21/30* (2013.01); *B60W 60/001* (2020.02); *G01C 21/3807* (2020.08); *G01C 21/3841* (2020.08); *G01C 21/3889* (2020.08); *B60W 2552/53* (2020.02); *B60W 2556/65* (2020.02)

(58) Field of Classification Search
CPC ................ G01C 21/30; G01C 21/3841; G01C 21/3889; G01C 21/3807; B60W 60/001; B60W 2552/53; B60W 2556/65
See application file for complete search history.

(56) References Cited

U.S. PATENT DOCUMENTS

| | | | |
|---|---|---|---|
| 2018/0345963 A1 | 12/2018 | Maura | |
| 2021/0316760 A1 | 10/2021 | Okoshi et al. | |

FOREIGN PATENT DOCUMENTS

| | | |
|---|---|---|
| CN | 108369777 A | 8/2018 |
| CN | 113179635 A | 7/2021 |
| JP | 2019-079189 A | 5/2019 |
| JP | 2019145016 A | 8/2019 |
| JP | 2021-012086 A | 2/2021 |
| JP | 2022-030241 A | 2/2022 |
| WO | 2021/070497 A | 4/2021 |

OTHER PUBLICATIONS

Chang, Argoverse: 3D Tracking and Forecasting with Rich Maps (Year: 2019).*
Prochowski, Research Scenarios of Autonomous Vehicles, the Sensors and Measurement Systems Used in Experiments, https://www.mdpi.com/1424-8220/22/17/6586 (Year: 2022).*

\* cited by examiner

*Primary Examiner* — Aryan E Weisenfeld
(74) *Attorney, Agent, or Firm* — Dinsmore & Shohl LLP

(57) ABSTRACT

An information processing device comprises a controller configured to execute: acquiring respective vehicle-mounted videos including an identical road section from a first vehicle that is an automated driving vehicle and a second vehicle that is a manual driving vehicle; identifying a first running trajectory corresponding to the first vehicle and a second running trajectory corresponding to the second vehicle on the basis of the vehicle-mounted videos; and making a judgment on a subject present at a first point that is a point with a divergence above a predetermined value between the first running trajectory and the second running trajectory.

16 Claims, 17 Drawing Sheets

1. UPLOAD VIDEO SHOT BY VEHICLE-MOUNTED CAMERA

2. MAKE JUDGMENT ON POINT WITH INTERFERENCE WITH AUTOMATED DRIVING ON BASIS OF VIDEO DATA

3. GIVE COMMAND FOR OPERATION ON BASIS OF RESULT OF JUDGMENT

VEHICLE-MOUNTED DEVICE 100

PROBE CAR 10

SERVER APPARATUS 200

AUTONOMOUS VEHICLE 300

VEHICLE-MOUNTED DEVICE 100

FIG. 4

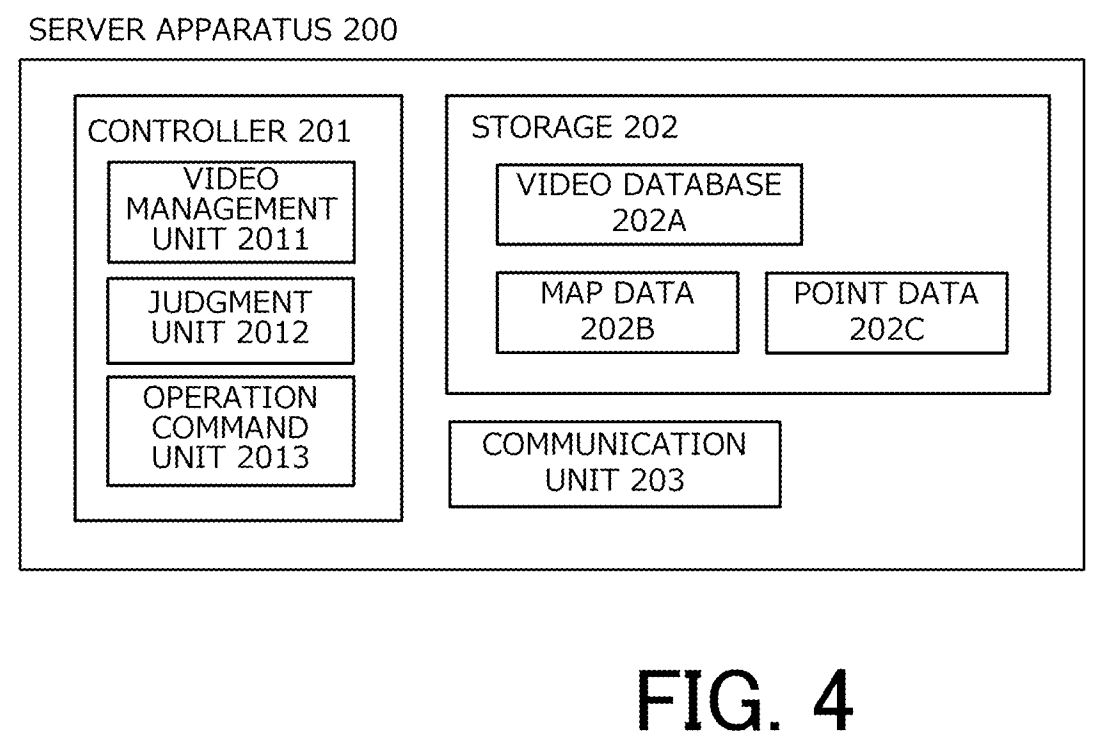

SERVER APPARATUS 200

CONTROLLER 201
- VIDEO MANAGEMENT UNIT 2011
- JUDGMENT UNIT 2012
- OPERATION COMMAND UNIT 2013

STORAGE 202
- VIDEO DATABASE 202A
- MAP DATA 202B
- POINT DATA 202C

COMMUNICATION UNIT 203

SKY(1)

NATURE(2)

VEHICLE(3)

BUILDINGS(4)

LANE LINE(5)

ROAD(6)

OWN VEHICLE(7)

ROAD SEGMENT

TRAJECTORY OF MANUAL
DRIVING VEHICLE

TRAJECTORY OF AUTOMATED
DRIVING VEHICLE

VIDEO DATABASE

| VEHICLE ID | TYPE | SHOOTING DATE AND TIME | VIDEO DATA | SEGMENT ID | ⋮ |
|---|---|---|---|---|---|
| V001 | AUTOMATED DRIVING | ⋮ | (Binary) | ⋮ | ⋮ |
| V002 | MANUAL DRIVING | ⋮ | (Binary) | ⋮ | ⋮ |
| ⋮ | ⋮ | ⋮ | ⋮ | ⋮ | ⋮ |

FIG. 8

POINT DATA

| DATE AND TIME | SEGMENT ID | TRAJECTORY DATA1 | TRAJECTORY DATA2 | DEGREE OF DIVERGENCE | SUBJECT |
|---|---|---|---|---|---|
| ⋮ | ⋮ | ⋮ | ⋮ | ⋮ | PARKED VEHICLE |
| ⋮ | ⋮ | ⋮ | ⋮ | ⋮ | ROAD CONSTRUCTION |

FIG. 9

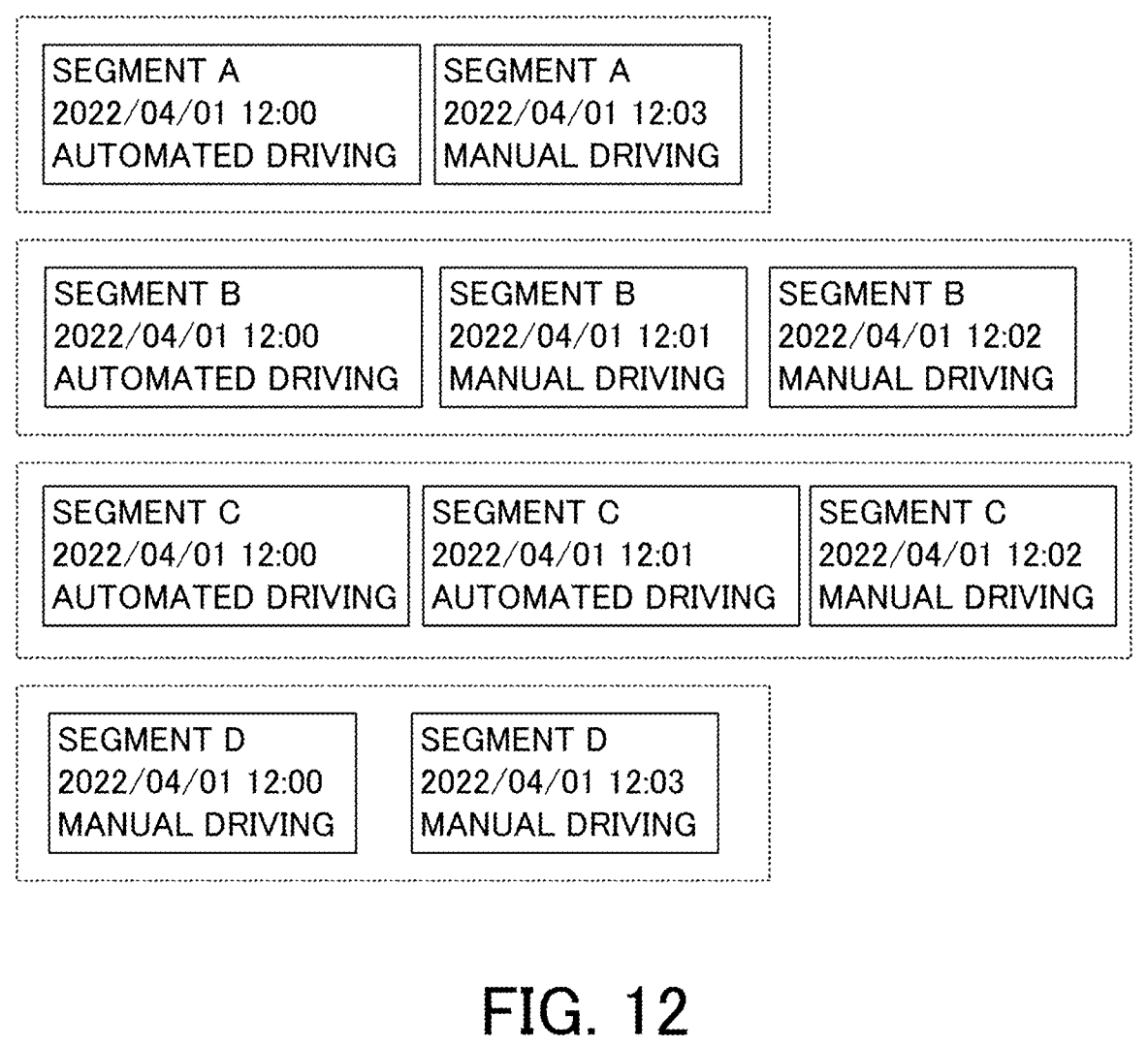

SEGMENT A
2022/04/01 12:00
AUTOMATED DRIVING

SEGMENT A
2022/04/01 12:03
MANUAL DRIVING

SEGMENT B
2022/04/01 12:00
AUTOMATED DRIVING

SEGMENT B
2022/04/01 12:01
MANUAL DRIVING

SEGMENT B
2022/04/01 12:02
MANUAL DRIVING

SEGMENT C
2022/04/01 12:00
AUTOMATED DRIVING

SEGMENT C
2022/04/01 12:01
AUTOMATED DRIVING

SEGMENT C
2022/04/01 12:02
MANUAL DRIVING

SEGMENT D
2022/04/01 12:00
MANUAL DRIVING

SEGMENT D
2022/04/01 12:03
MANUAL DRIVING

FIG. 12

MAP DATA GENERATED ON BASIS OF DATA ACQUIRED DURING MOST
RECENT PREDETERMINED PERIOD (E.G., 10 MINUTES IN PAST)

SUBJECT DATA

| CATEGORY | SUBCATEGORY | SCORE |
|---|---|---|
| PARKED VEHICLE | SMALL-SIZE CAR | 3 |
| PARKED VEHICLE | LARGE-SIZE CAR | 6 |
| ROAD CONSTRUCTION | WITH LANE REGULATION | 2 |
| ROAD CONSTRUCTION | WITHOUT LANE REGULATION | 10 |
| BICYCLE | ... | ... |
| ... | ... | ... |

FIG. 16

POINT DATA

| DATE AND TIME | POINT | TRAJECTORY DATA1 | TRAJECTORY DATA2 | DEGREE OF DIVERGENCE | SUBJECT | SCORE |
|---|---|---|---|---|---|---|
| ... | ... | ... | ... | ... | PARKED VEHICLE | 6 |
| ... | ... | ... | ... | ... | ROAD CONSTRUCTION | 10 |

FIG. 17

INFORMATION PROCESSING DEVICE AND INFORMATION PROCESSING SYSTEM

CROSS REFERENCE TO THE RELATED APPLICATION

This application claims the benefit of Japanese Patent Application No. 2022-079237, filed on May 13, 2022, which is hereby incorporated by reference herein in its entirety.

BACKGROUND

Technical Field

The present disclosure relates to an automated driving vehicle.

Description of the Related Art

Various attempts have been made to enhance running stability of an automated driving vehicle.

In association with this, Japanese Patent Laid-Open No. 2019-145016 discloses a system which detects a difference in driving manipulation between a manual driving vehicle and an automated driving vehicle and records a point at which a difference is not less than a threshold.

SUMMARY

It is an object of the present disclosure to enhance running stability of an automated driving vehicle.

The present disclosure in its one aspect provides an information processing device comprises a controller configured to execute: acquiring respective vehicle-mounted videos including an identical road section from a first vehicle that is an automated driving vehicle and a second vehicle that is a manual driving vehicle; identifying a first running trajectory corresponding to the first vehicle and a second running trajectory corresponding to the second vehicle on the basis of the vehicle-mounted videos; and making a judgment on a subject present at a first point that is a point with a divergence above a predetermined value between the first running trajectory and the second running trajectory.

The present disclosure in its another aspect provides an information processing system including a vehicle-mounted device mounted on an automated driving vehicle or a manual driving vehicle and a server apparatus, wherein the vehicle-mounted device includes a first controller configured to transmit a vehicle-mounted video shot by a vehicle-mounted camera to the server apparatus, and the server apparatus includes a second controller configured to execute: identifying a first running trajectory corresponding to the automated driving vehicle and a second running trajectory corresponding to the manual driving vehicle on the basis of the vehicle-mounted video including an identical road section; and making a judgment on a subject present at a first point that is a point with a divergence above a predetermined value between the first running trajectory and the second running trajectory.

Another aspect of the present disclosure is a method to be executed by the above-described device or a computer-readable storage medium non-transitorily storing a program for executing the method.

According to the present disclosure, it is possible to enhance running stability of an automated driving vehicle.

BRIEF DESCRIPTION OF THE DRAWINGS

FIG. 4 is a diagram illustrating in detail constituent elements of a server apparatus 200;

FIG. 8 is an example of data to be stored in a video database 202A;

FIG. 9 is an example of point data 202C;

FIG. 12 is an example of video data extracted in step S21;

FIG. 16 is an example of subject data according to a second embodiment; and

FIG. 17 is an example of point data according to the second embodiment.

DESCRIPTION OF THE EMBODIMENTS

Figure 1:
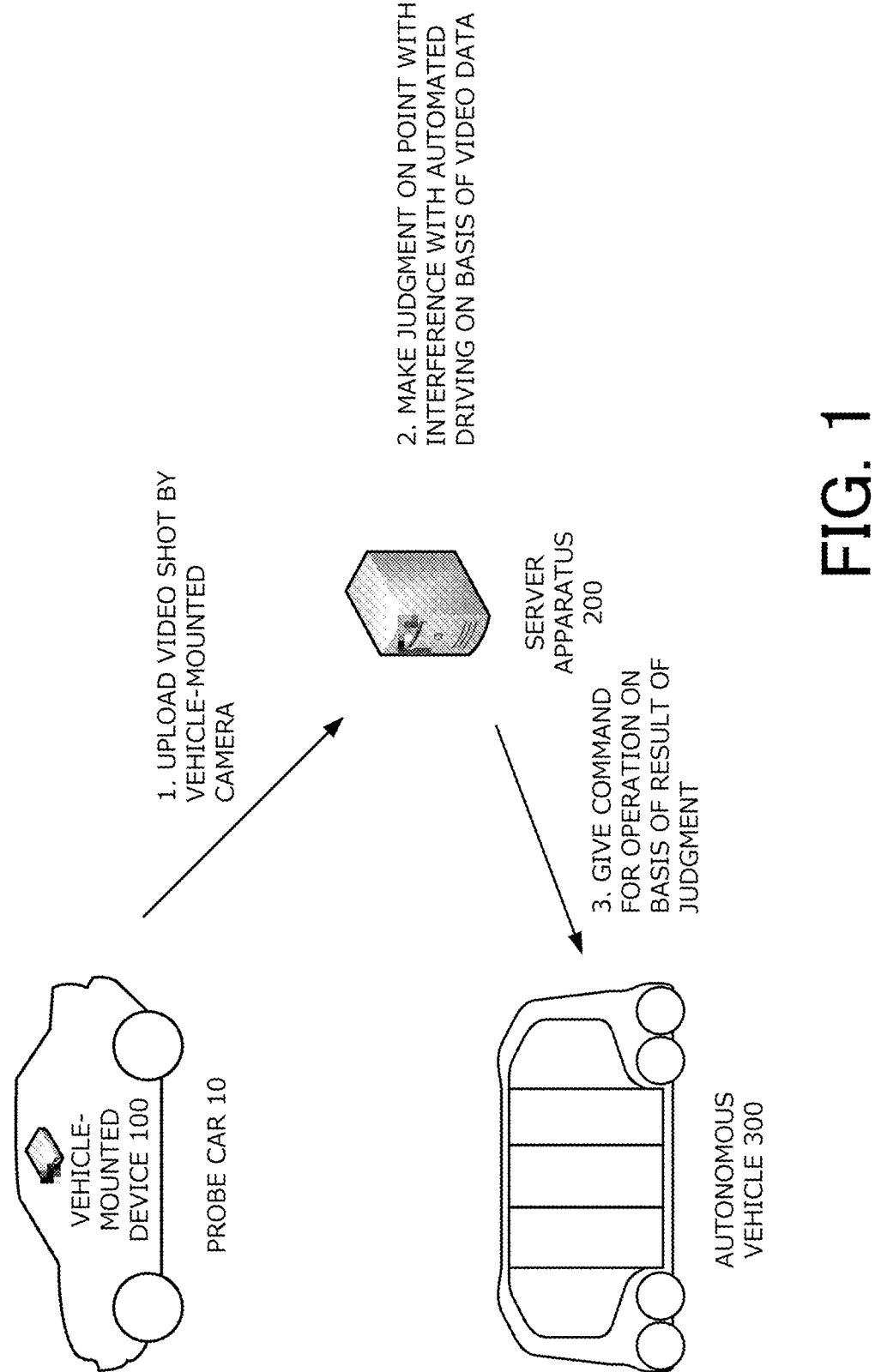
FIG. 1 is a chart for explaining an outline of a vehicle system.

An automated driving vehicle controls acceleration and deceleration and steering on the basis of information obtained by sensing. However, if an unexpected object is present near a road, the automated driving vehicle cannot make an accurate decision to become incapable of performing smooth running or to decrease in running safety. For this reason, there is an attempt to identify a point through which an automated driving vehicle cannot pass smoothly by detecting a difference between a manipulation signal generated by the automated driving vehicle and a driving manipulation performed by a driver.

However, since there are various causes of the inability of an automated driving vehicle to run smoothly, the automated driving vehicle may be incapable of making an appropriate response only by identification of a point. For example, many resources may be assigned to a pedestrian sensing process at a location where a sidewalk is so narrow that a pedestrian often protrudes into a roadway, and many resources may be assigned to a process of recognizing instructions from a flagger at a location where one-lane alternating traffic is in effect due to road construction.

Since an existing technique does not judge what is present at a point through which an automated driving vehicle cannot pass smoothly, an appropriate process for enhancing running stability of the automated driving car cannot be performed.

An information processing device according to the present disclosure solves the above-described problem.

An information processing device according to one aspect of the present disclosure includes a controller configured to execute acquiring respective vehicle-mounted videos including an identical road section from a first vehicle that is an automated driving vehicle and a second vehicle that is a manual driving vehicle, identifying a first running trajectory corresponding to the first vehicle and a second running trajectory corresponding to the second vehicle on the basis of the vehicle-mounted videos, and making a judgment on a subject present at a first point that is a point with a divergence above a predetermined value between the first running trajectory and the second running trajectory.

The first vehicle is an automated driving vehicle, i.e., a vehicle which runs autonomously on the basis of a sensing result. The second vehicle is a vehicle which runs by a driving manipulation of a driver. A vehicle-mounted video is a video which is shot by a camera mounted on a vehicle.

The controller identifies the running trajectories of the first vehicle and the second vehicle and compares the running trajectories with each other on the basis of the vehicle-mounted videos including the identical road section.

Generally, if some problem occurs in running of an automated driving vehicle, a trajectory tends to be disordered, as compared with a manual driving vehicle. For this reason, a point (the first point) of the automated driving vehicle's failure to run smoothly can be identified by comparing the trajectories of the manual driving vehicle and the automated driving vehicle in the identical road section.

Note that a running trajectory may be a collection of a plurality of pieces of position information or a collection of position transitions in plurality of timesteps. The running trajectory may be based on a lane line. The running trajectory can be identified on the basis of, for example, a position of a lane line detected from a vehicle-mounted video.

The controller also makes a judgment on a subject present at the first point.

For example, an object which can interfere with automated driving, such as a parked vehicle, road construction, a pedestrian, a bicycle, a fallen object, a puddle, or any other obstacle, can be regarded as the subject. Note that the subject may be anything other than an object, such as a depression or a crack in a road, or a faded white line. A judgment on the subject may be made by, for example, performing pattern matching on a plurality of frames included in a video.

Note that the controller need not necessarily identify what the subject is. For example, the controller may only assign some class or give some label to the subject by machine learning or the like.

Information on the first point can be used to enhance running stability or running safety of an automated driving vehicle. For example, the information on the subject present at the first point may be transmitted to a third vehicle that is an automated driving vehicle. Note that the first vehicle and the third vehicle may be an identical vehicle.

Additionally, the controller may give a score to the identified first point. For example, a value related to the degree of smoothness of traffic which changes due to the subject may be adopted as the score. For example, a higher score may be given when a subject which obstructs traffic to a greater degree is present.

The score may be stored in association with the first point. For example, a map indicating a point requiring attention to running of the automated driving vehicle can be generated by mapping the score onto a road map. The automated driving vehicle can be controlled using the map. For example, if the information processing device is a device which provides route information to the automated driving vehicle, a route circumventing the first point may be generated on the basis of the map. If the information processing device is a device which controls operation of the automated driving car, the information processing device may command the automated driving car to bypass the first point. The map may be distributed to the automated driving vehicle.

Specific embodiments of the present disclosure will be described below with reference to the drawings. A hardware configuration, a module configuration, a functional configuration, and the like described in each embodiment are not intended to limit a technical scope of the disclosure only to the configurations unless otherwise described.

First Embodiment

An outline of a vehicle system according to a first embodiment will be described with reference to FIG. 1.

The vehicle system according to the present embodiment is configured to include a probe car 10, a server apparatus 200, and an autonomous vehicle 300.

The probe car 10 is a vehicle for collecting data. The probe car 10 may be an autonomous vehicle or a vehicle driven by a driver. For example, a general vehicle which has a data provision contract with a service provider can be adopted as the probe car 10.

The autonomous vehicle 300 is an automated driving vehicle which provides a predetermined service. The autonomous vehicle 300 may be a vehicle which transports passengers or freight, a mobile shop vehicle, or the like. The autonomous vehicle 300 can run autonomously in accordance with a command transmitted from the server apparatus 200 and provide the predetermined service.

The server apparatus 200 is an apparatus which controls operation of the autonomous vehicle 300. The server apparatus 200 makes a judgment on a point with interference with running of the autonomous vehicle 300 on the basis of data collected from the probe car 10 and performs a predetermined process for enhancing running stability of an autonomous vehicle on the basis of a result of the judgment.

Elements constituting the system will be described.

The probe car 10 is a connected car having a communication function with an external network. The probe car 10 has a vehicle-mounted device 100 mounted thereon.

The vehicle-mounted device 100 is a computer for performing information collection. In the present embodiment, the vehicle-mounted device 100 has a camera which is installed to face a front of the vehicle and transmits an acquired video to the server apparatus 200 at a predetermined time. Hereinafter, a video acquired by the vehicle-mounted device 100 is referred to as a vehicle-mounted video.

The vehicle-mounted device 100 may be a device (e.g., a car navigation device) which provides information to a passenger of the probe car 10 or an electronic control unit (ECU) which the probe car 10 has. The vehicle-mounted device 100 may be a data communication module (DCM) having a communication function.

The vehicle-mounted device 100 can be configured as a computer having a processor, such as a CPU or a GPU, a main memory, such as a RAM or a ROM, and an auxiliary memory, such as an EPROM, a hard disk drive, or a removable medium. An operating system (OS), various types of programs, various types of tables, and the like are stored in the auxiliary memory, and functions suiting a predetermined purpose as will be described later can be implemented by executing a program stored therein. Note that some or all of the functions may be implemented by a hardware circuit, such as an ASIC or an FPGA.

Figure 2:
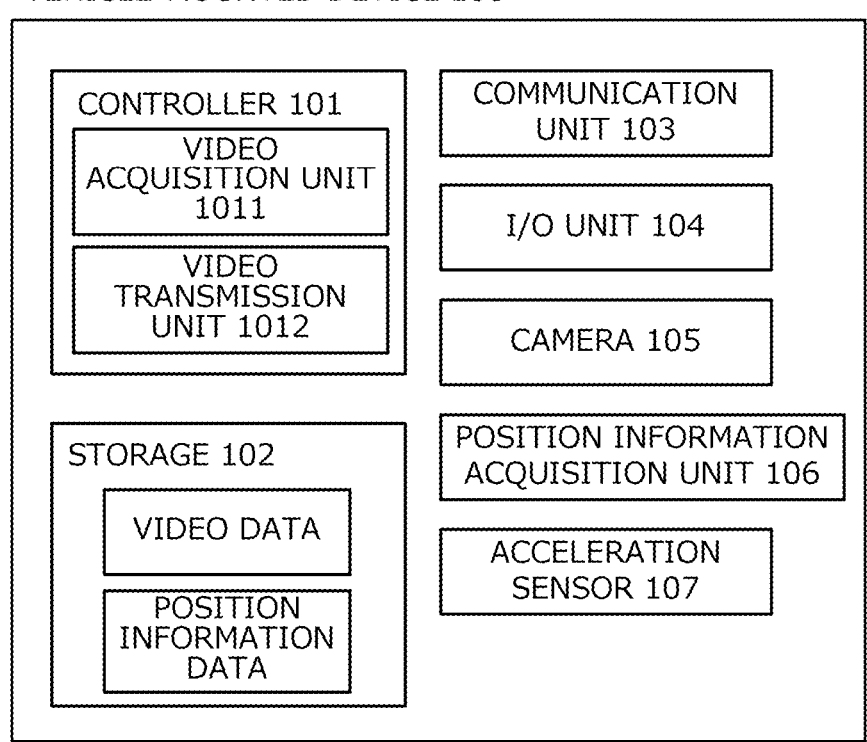
FIG. 2 is a diagram illustrating a system configuration of a vehicle-mounted device 100.

FIG. 2 is a diagram illustrating a system configuration of the vehicle-mounted device 100.

The vehicle-mounted device 100 is configured to include a controller 101, a storage 102, a communication unit 103, an I/O unit 104, a camera 105, a position information acquisition unit 106, and an acceleration sensor 107.

The controller 101 is an arithmetic unit which implements various types of functions of the vehicle-mounted device 100 by executing a predetermined program. The controller 101 may be implemented by, for example, a CPU.

The controller 101 is configured to include, as functional modules, a video acquisition unit 1011 and a video transmission unit 1012. The functional modules may be implemented through execution of a stored program by the CPU.

The video acquisition unit 1011 shoots a video through the camera 105 (to be described later) and saves the video in the storage 102. The video acquisition unit 1011 generates a new storage region (e.g., a folder or a directory) when the power to the device is turned on.

The video acquisition unit 1011 shoots a video through the camera 105 and saves obtained data (video data) in the storage 102 when the vehicle-mounted device 100 is in operation. Video data is saved on a per-file basis. There is an upper limit (e.g., one minute or five minutes) to a video length corresponding to one file. When the upper limit is exceeded, a new file is generated. Note that, if the video acquisition unit 1011 runs short of storage capacity, the video acquisition unit 1011 deletes the oldest file and frees up space, and continues shooting.

The video acquisition unit 1011 also acquires vehicle position information with a predetermined period (e.g., every second) through the position information acquisition unit 106 (to be described later) and saves the vehicle position information as position information data.

Figure 3:
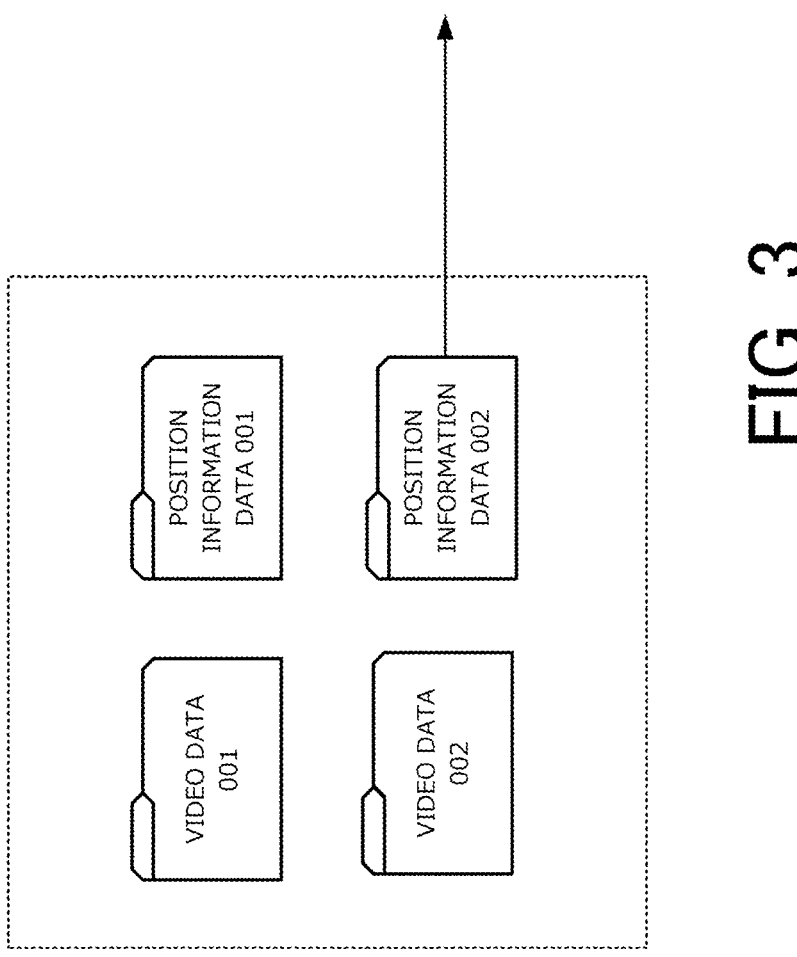
FIG. 3 is a schematic chart of video data and position information data saved in a storage 102.

FIG. 3 is a schematic chart of video data and position information data to be saved in the storage 102. As illustrated in FIG. 3, video data corresponds one-to-one with position information data. Saving of both video data and position information data in association with each other allows ex-post identification of a running position of the vehicle.

The video transmission unit 1012 transmits stored video data to the server apparatus 200 at a predetermined time. The predetermined time may be a time which comes periodically. For example, the video transmission unit 1012 may transmit video data recorded in an immediately preceding file to the server apparatus 200 at a time when a file is newly generated.

The storage 102 is a memory device including the main memory and the auxiliary memory. The operating system (OS), the various types of programs, the various types of tables, and the like are stored in the auxiliary memory, and the functions suiting the predetermined purpose as will be described later can be implemented by loading a program stored therein into the main memory and executing the program.

The main memory may include a RAM (Random Access Memory) or a ROM (Read Only Memory). The auxiliary memory may include an EPROM (Erasable Programmable ROM) or a hard disk drive (HDD). The auxiliary memory may also include a removable medium, i.e., a removable recording medium.

Data generated by the controller 101, i.e., video data and position information data are saved in the storage 102.

The communication unit 103 is a wireless communication interface for connection of the vehicle-mounted device 100 to a network. The communication unit 103 is configured to be capable of communication with the server apparatus 200 by a mobile communication network, a wireless LAN, or a communications standard, such as Bluetooth®.

The I/O unit 104 is a unit which accepts an input manipulation performed by a user and presents information to the user. The I/O unit 104 is configured to include, for example, a liquid crystal display, a touch panel display, or a hardware switch.

The camera 105 is an optical unit including an image sensor for acquisition of an image. The camera 105 is mounted to face the front of the vehicle.

The position information acquisition unit 106 calculates position information on the basis of a positioning signal transmitted from a positioning satellite (also referred to as a GNSS satellite). The position information acquisition unit 106 may include an antenna which receives radio waves transmitted from the GNSS satellite.

The acceleration sensor 107 is a sensor which measures an acceleration to which the device is subjected. A measurement result is supplied to the controller 101. This allows the controller 101 to judge that a shock is given to the vehicle.

The server apparatus 200 will be described.

The server apparatus 200 is an apparatus which controls operation of the autonomous vehicle 300. The server apparatus 200 has a function of making a judgment on a point with interference with running of an autonomous vehicle on the basis of pieces of video data acquired from a plurality of probe cars 10 (vehicle-mounted devices 100).

A point with interference with running of an autonomous vehicle will be referred to as an unsuitable point in the following description.

FIG. 4 is a diagram illustrating in detail constituent elements of the server apparatus 200 which are included in the vehicle system according to the present embodiment.

The server apparatus 200 can be configured as a computer having a processor, such as a CPU or a GPU, a main memory, such as a RAM or a ROM, and an auxiliary memory, such as an EPROM, a hard disk drive, or a removable medium. An operating system (OS), various types of programs, various types of tables, and the like are stored in the auxiliary memory. A program stored in the auxiliary memory is loaded into a work region of the main memory and is executed, and constituent units and the like are controlled through the execution of the program. This allows implementation of functions suiting a predetermined purpose as will be described later. Note that some or all of the functions may be implemented by a hardware circuit, such as an ASIC or an FPGA.

The server apparatus 200 is configured to include a controller 201, a storage 202, and a communication unit 203.

The controller 201 is an arithmetic device which is responsible for control to be performed by the server apparatus 200. The controller 201 can be implemented by an arithmetic processing device, such as a CPU.

The controller 201 is configured to include, as functional modules, a video management unit 2011, a judgment unit 2012, and an operation command unit 2013. The functional modules may be implemented through execution of a stored program by the CPU.

The video management unit 2011 executes a process of collecting pieces of video data transmitted from the plurality of probe cars 10 (vehicle-mounted devices 100) and storing the pieces of video data in the storage 202 (to be described later) (a video database 202A). In the present embodiment, the video management unit 2011 divides received video data into respective pieces for predetermined road segments (on the basis of, for example, map data 202B (to be described later)).

The judgment unit 2012 makes a judgment on a point (unsuitable point) with interference with running of an autonomous vehicle on the basis of collected video data.

Here, a point with interference with running of an autonomous vehicle will be described. The autonomous vehicle 300 according to the present embodiment is a vehicle which runs while recognizing a position of a lane or an obstacle on the basis of an image acquired by a stereo camera.

Since there are various objects in a road environment, it is often the case that an automated driving vehicle cannot run smoothly. For example, if there is an unexpected parked vehicle present on a roadway, the automated driving vehicle may unnecessarily reduce speed on alert for a pedestrian rushing out. If lane regulation is in execution due to construction or the like, the automated driving car may fail to understand an instruction from a flagger and may stop running temporarily.

Under the circumstances, in the present embodiment, the judgment unit 2012 makes a judgment on a point with interference with running of an autonomous vehicle on the basis of pieces of video data collected by the plurality of probe cars 10. The operation command unit 2013 (to be described later) takes measures to enhance stability or safety of an autonomous vehicle on the basis of a result of the judgment.

Firstly, the judgment unit 2012 compares trajectories of a plurality of probe cars (an automated driving vehicle and a manual driving vehicle) at the time of running along an identical road segment during close on the basis of collected vehicle-mounted videos.

A trajectory of a vehicle can be identified on the basis of a position of a lane line extracted from a frame included in a video.

The presence of a lane line can be recognized by, for example, a segmentation technique. The segmentation technique is a technique for categorizing objects included in an image into a plurality of classes and can be mainly implemented by a machine learning model. By performing segmentation, for example, the label "sky," the label "nature," the label "vehicle," the label "building," the label "white line (lane line)," the label "road," and the label "own vehicle" can be given to the plurality of objects included in the image.

Figure 5:
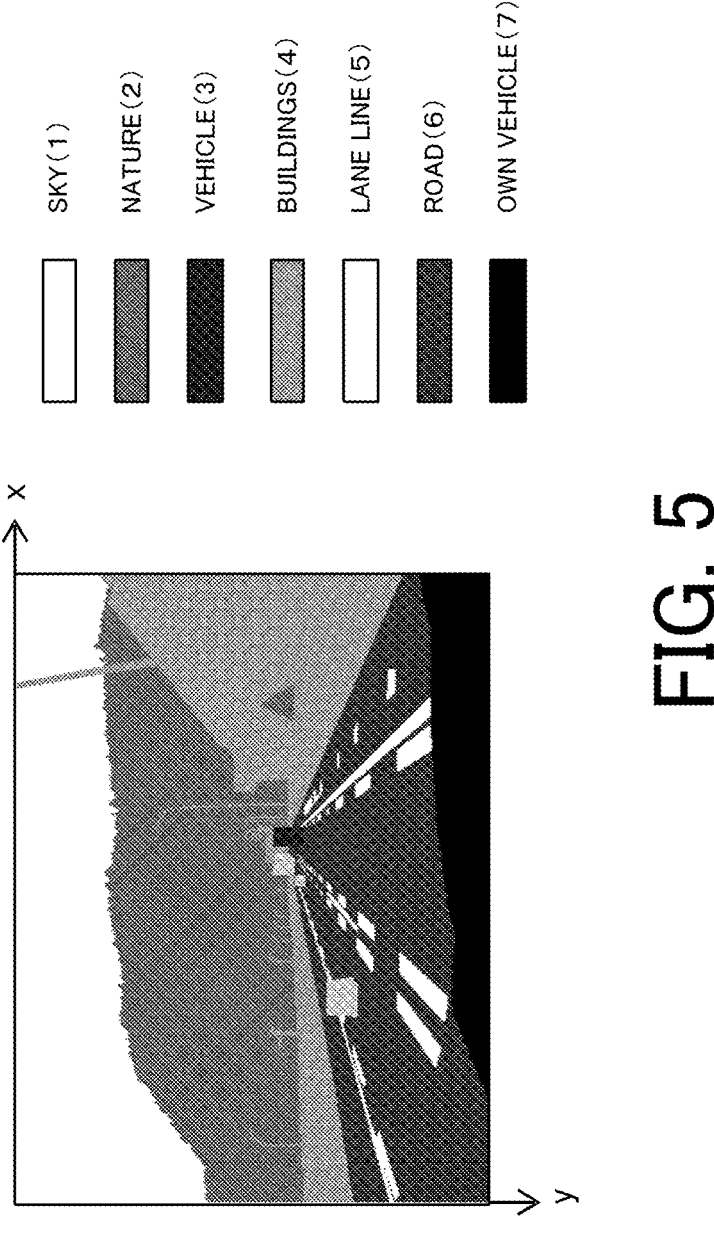
FIG. 5 is an example of an image to which labels are given by segmentation.

FIG. 5 is an example of an image in which labels are given by segmentation.

The judgment unit 2012 can judge an ordinal position of a lane in which the probe car 10 is running, on the basis of a position of pixels to which a label corresponding to a lane line is given.

Figure 6A:
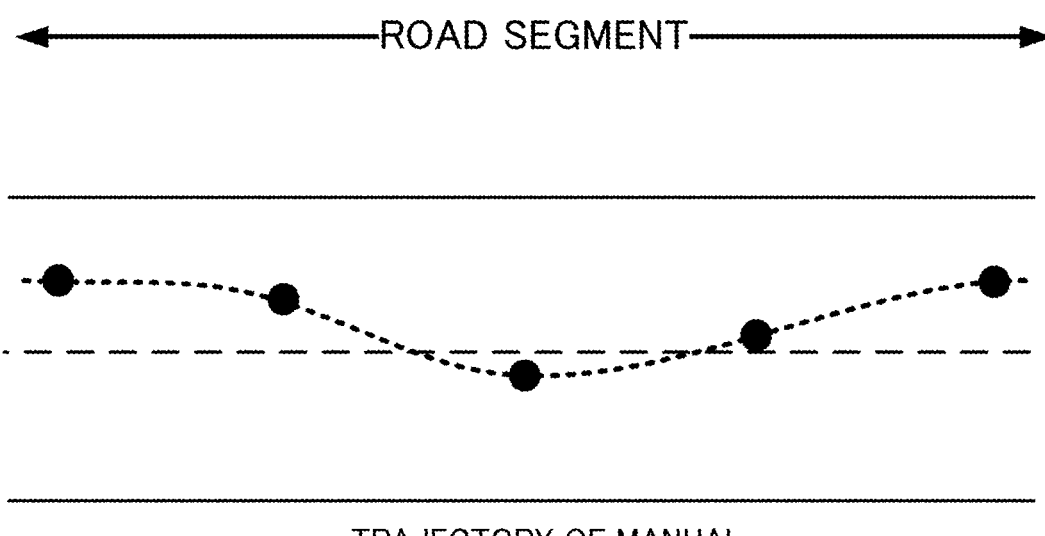
FIGS. 6A and 6B are plan views representing trajectories of probe cars 10 at a given location.
Figure 6B:
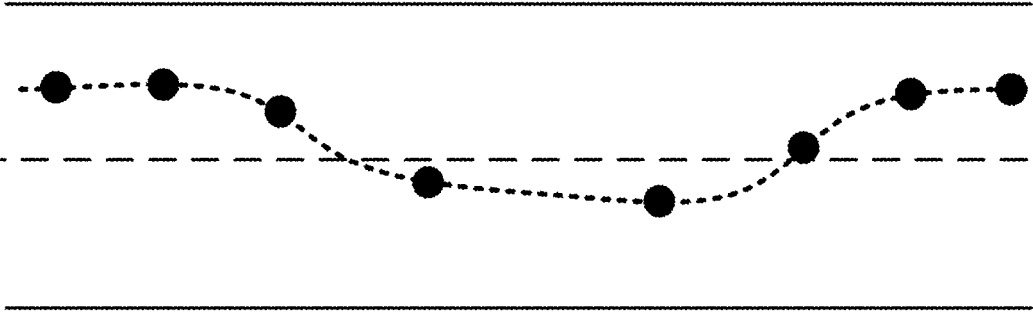

The judgment unit 2012 can also judge where a center of the vehicle is located in the lane, on the basis of the position of the pixels, to which the label corresponding to the lane line is given, and a mounting position of the camera 105. In the present example, a line drawn by a center of a vehicle is regarded as a trajectory of the vehicle. FIGS. 6A and 6B are plan views representing trajectories of the probe cars 10 in a given road segment. The present example illustrates how the probe cars 10 circumvent an obstacle on a road.

The judgment unit 2012 executes trajectory identification for each road segment.

As described earlier, the judgment unit 2012 compares trajectories of an automated driving vehicle and a manual driving vehicle.

FIG. 6A represents a trajectory corresponding to the probe car 10 that is a manual driving vehicle, and FIG. 6B represents a trajectory corresponding to the probe car 10 that is an automated driving vehicle. Black circles in FIGS. 6A and 6B represent passage of time. For example, if an interval between black circles is two seconds, this means that a time period taken for the vehicle corresponding to FIG. 6A to perform a circumvention action is eight seconds and that a time period taken for the vehicle corresponding to FIG. 6B to perform a circumvention action is 14 seconds.

Here, if there is a divergence above a predetermined value between the both trajectories, the automated driving vehicle is presumed to have failed to run smoothly for some reason.

Figure 7:
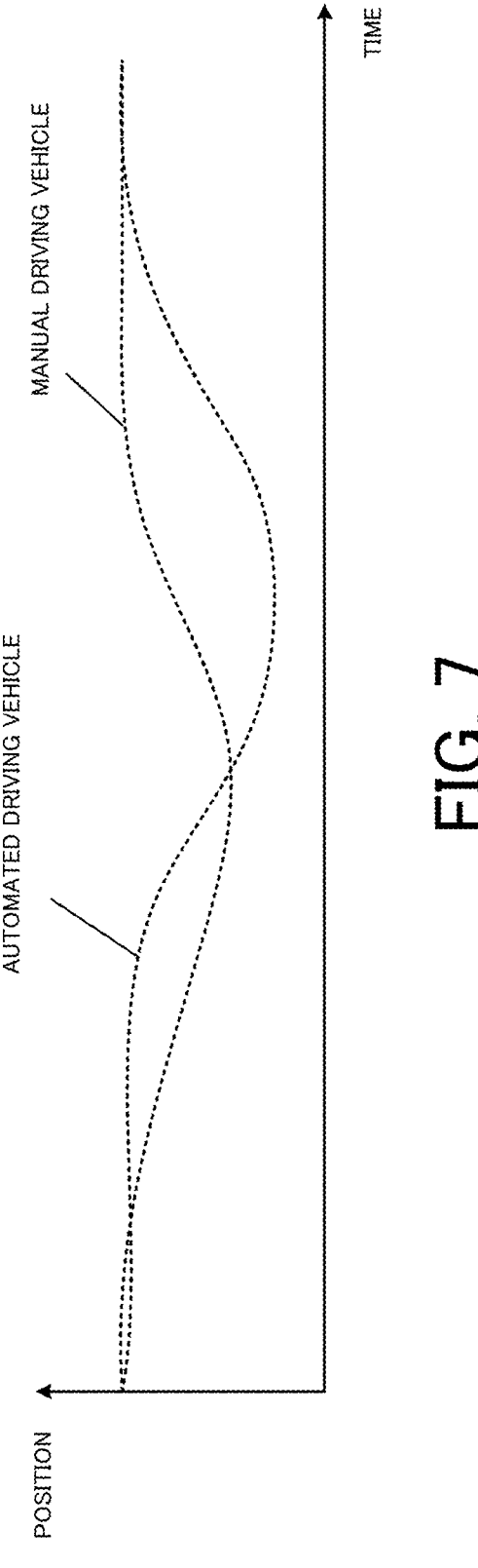
FIG. 7 is a graph in which changes in position over time are plotted on a two-dimensional plane.

FIG. 7 is a graph in which changes in position over time are plotted on a two-dimensional plane. The degree of divergence between lines illustrated in FIG. 7 can be regarded as a divergence between the trajectories. Note that although the trajectories are plotted on the two-dimensional plane in the example in FIG. 7, a trajectory may be plotted in a three-dimensional space having an X axis, a Y axis, and a time axis. The judgment unit 2012 makes a judgment of the degree of divergence for each road segment.

Note that, if a plurality of probe cars passing through an identical road segment are present, the plurality of probe cars may be placed into an automated driving vehicle group and a manual driving vehicle group, respective trajectories representing the groups may be obtained, and the degree of divergence between the trajectories may be obtained. A trajectory representing a group may be obtained from, for example, average values.

The judgment unit 2012 reflects a result of the judgment in point data 202C (to be described later). In the present embodiment, the point data 202C is data obtained by associating the degree of divergence between trajectories with a road segment.

Secondly, the judgment unit 2012 makes a judgment on an unsuitable point on the basis of the point data 202C. For example, a predetermined range including a point of occurrence of a divergence as described earlier can be regarded as the unsuitable point. The predetermined range may be, for example, a road segment. Information on an unsuitable point generated by the judgment unit 2012 is transmitted to the operation command unit 2013.

The operation command unit 2013 generates an operation plan for the predetermined autonomous vehicle 300 and transmits the generated operation plan to the autonomous vehicle 300.

The operation plan is data telling a task to be executed to the autonomous vehicle 300. If the autonomous vehicle 300 is a vehicle which transports passengers, examples of the task include a task of picking up and discharging passengers and a task of running to a predetermined point. If the autonomous vehicle 300 is a vehicle which transports baggage, examples of the task include a task of picking up baggage, a task of running to a predetermined point, and a task of delivering baggage. If the autonomous vehicle 300 is a mobile shop, examples of the task include a task of running to a predetermined point and a task of opening the shop at a place of arrival.

The operation command unit 2013 generates an operation plan which is a combination of a plurality of tasks. The autonomous vehicle 300 can provide the predetermined service by completing tasks in order in accordance with the operation plan. The operation plan may include a route to be run by the autonomous vehicle 300.

The operation command unit 2013 also takes predetermined measures to enhance running stability of an autonomous vehicle on the basis of an unsuitable point obtained by judgment.

As the measures to enhance stability or safety of an autonomous vehicle, for example, the following measures can be taken.

(1) Regenerate route circumventing unsuitable point

When a route circumventing an unsuitable point is regenerated, an operation plan is modified on the basis of the route obtained by the regeneration.

(2) Make judgment on resources needed to pass through unsuitable point

For example, data instructing the autonomous vehicle 300 such that more resources are distributed to pedestrian detection when a road segment in which many pedestrians are present on a roadway is passed through is included in the operation plan. This allows the autonomous vehicle 300 to pass more safely through the target road segment.

Note that the above-described measures are an example and that a process other than the illustrated ones may be executed as long as stability or safety of an autonomous vehicle can be enhanced. The details of the process may differ depending on the subject.

The storage 202 is configured to include a main memory and an auxiliary memory. The main memory is a memory into which a program to be executed by the controller 201 or data to be used by the control program is loaded. The auxiliary memory is a device in which a program to be executed by the controller 201 and data to be used by the control program are stored.

The video database 202A, the map data 202B, and the point data 202C are stored in the storage 202.

The video database 202A is a database storing a plurality of vehicle-mounted videos transmitted from the vehicle-mounted device 100. FIG. 8 is an example of data to be stored in the video database 202A. As illustrated in FIG. 8, an identifier of a vehicle which is a transmitter of a vehicle-mounted video, the type (whether the vehicle is an automated driving vehicle) of the vehicle, a shooting date and time, video data, an identifier of a road segment, and the like are included in the video database 202A.

Note that stored data may be deleted at a predetermined time (e.g., a time after a lapse of a predetermined time period since reception).

The map data 202B is a database storing a road map. The road map can be expressed as, for example, a collection of nodes and links. The map data 202B includes definitions of nodes, links, and road segments included in each link. A road segment is a unit section obtained by cutting a road link in predetermined lengths. Each road segment is associated with position information (latitude and longitude), an address, a point name, a road name, and the like. In the present embodiment, comparison between trajectories is performed on a per-road-segment basis.

The point data 202C is data in which a result of a judgment made by the judgment unit 2012 is recorded. The judgment unit 2012 compares trajectories of a plurality of probe cars 10 passing through a given road segment and reflects a result of the comparison in the point data 202C, as described earlier.

FIG. 9 is an example of the point data 202C.

In the present example, the point data 202C has respective fields for date and time, point, trajectory data 1, trajectory data 2, degree of divergence, and subject.

In the date and time field, information on a date and time (time period) of running of a probe car is stored. In the point field, data for identification of a target point is stored. As an example of the data, for example, an identifier of a road segment, latitude and longitude, or the like can be taken. In the trajectory data field 1, trajectory data of the probe car 10 that is an automated driving vehicle is stored. In the trajectory data field 2, trajectory data of the probe car 10 that is a manual driving vehicle is stored. In the degree-of-divergence field, the degree of divergence calculated is stored. In the subject field, information on a subject obtained by judgment by the server apparatus 200 is stored.

The communication unit 203 is a communication interface for connection of the server apparatus 200 to a network. The communication unit 203 is configured to include, for example, a network interface board and a wireless communication interface for wireless communication.

Note that the configurations illustrated in FIGS. 2 and 4 are examples and that some or all of the illustrated functions may be each executed using a specifically designed circuit. Program storage and execution may be performed by a combination of main memories and auxiliary memories other than the illustrated ones.

Details of processes to be executed by devices and apparatuses included in the vehicle system will be described.

Figure 10:
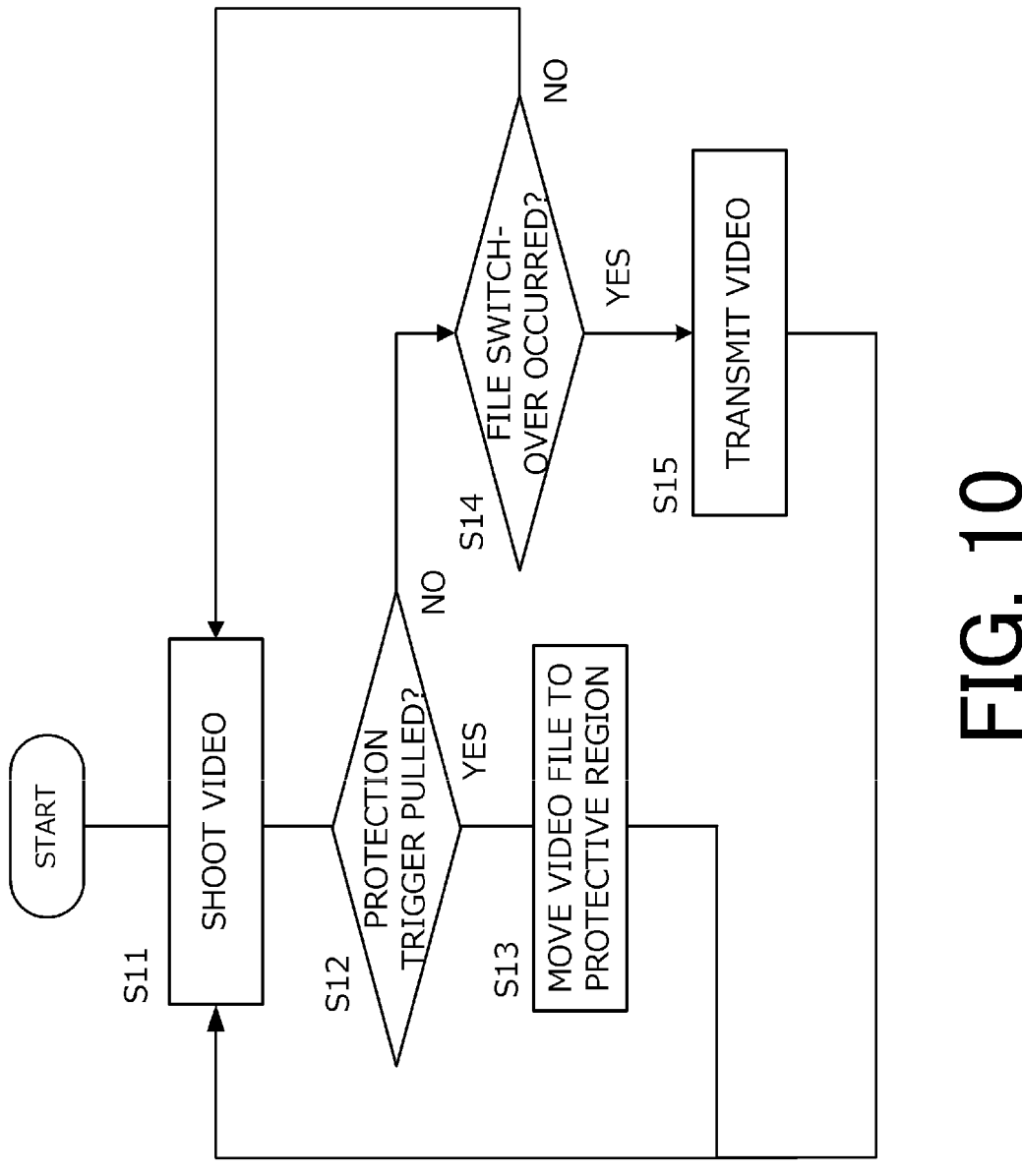
FIG. 10 is a flowchart of a process to be executed by the vehicle-mounted device 100.

FIG. 10 is a flowchart of a process to be executed by the vehicle-mounted device 100. The process illustrated in FIG. 10 is iteratively executed by the controller 101 while power is supplied to the vehicle-mounted device 100.

In step S11, the video acquisition unit 1011 shoots a vehicle-mounted video using the camera 105. In this step, the video acquisition unit 1011 records picture signals output from the camera 105 as video data in a file. As described with reference to FIG. 3, a file is split each time a predetermined length is exceeded. Note that, if a storage region of the storage 102 is insufficient, files are overwritten in order from the oldest file. In the step, the video acquisition unit 1011 periodically acquires position information through the position information acquisition unit 106 and records the acquired position information in position information data.

In step S12, the video acquisition unit 1011 judges whether a protection trigger is pulled. For example, if a shock is sensed by the acceleration sensor 107 or if a user presses a save button provided at a device body, the protection trigger is pulled. In this case, the process shifts to step S13, and the video acquisition unit 1011 moves a file being currently recorded to a protective region. The protective region is a region where automatic overwriting of a file is not performed. This allows protection of a file in which a key scene is recorded.

If the protection trigger is not pulled, the process shifts to step S14, and it is judged whether switchover between files has occurred. As described earlier, there is an upper limit (e.g., one minute or five minutes) to a video length corresponding to one file. When the upper limit is exceeded, a new file is generated. If switchover has occurred, the process shifts to step S15. Otherwise, the process returns to step S11.

In step S15, the video transmission unit 1012 transmits target video data to the server apparatus 200 together with position information data.

When the server apparatus 200 (the video management unit 2011) receives video data, the server apparatus 200 identifies road segments, along which the probe car 10 has run, on the basis of position information data, divides the video data into respective pieces for the road segments, and stores the pieces in the video database 202A. In the description below, one piece of video data corresponds to one road segment.

Details of a process to be executed by the server apparatus 200 will be described.

Figure 11:
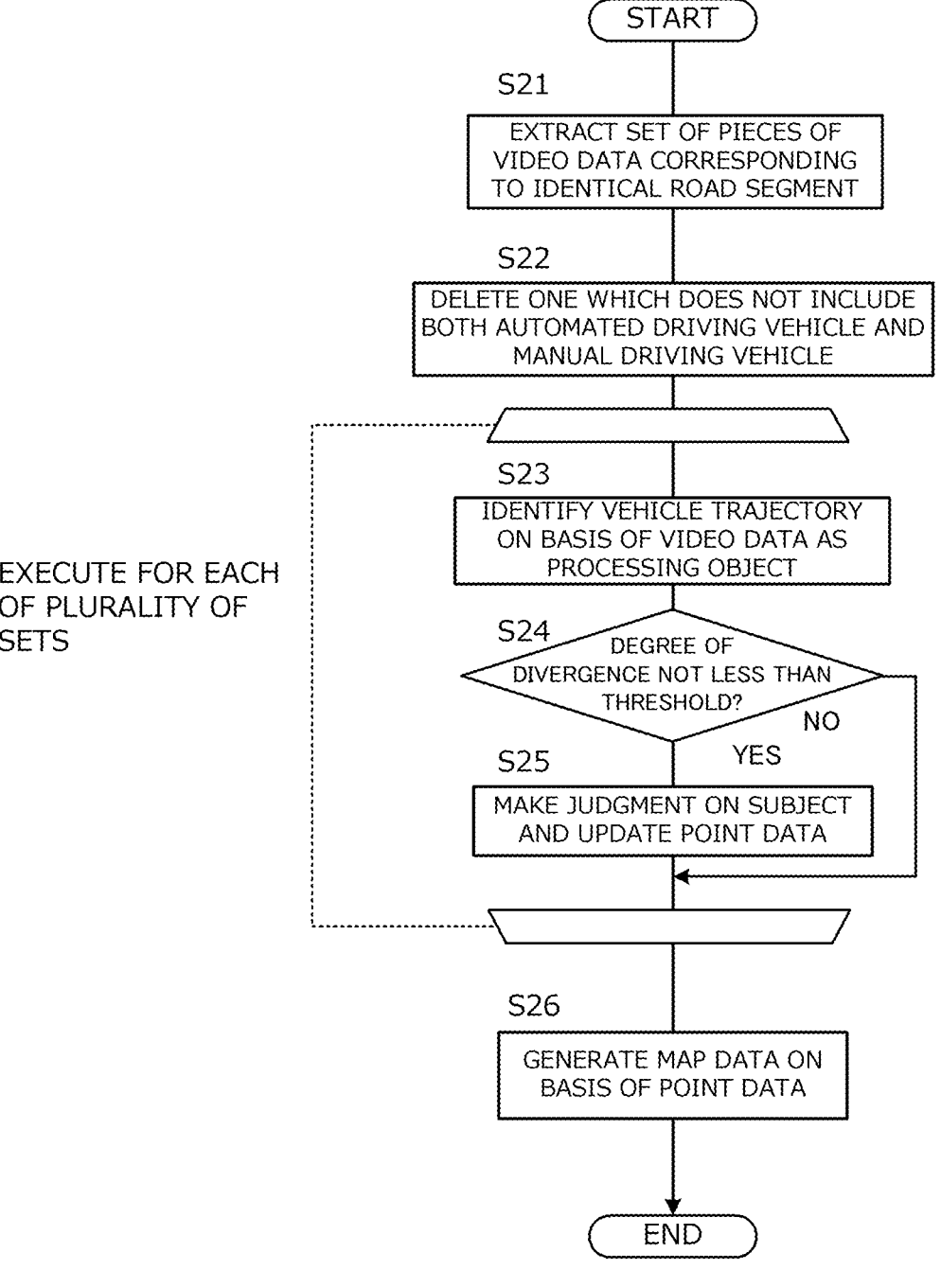
FIG. 11 is a flowchart of a process of generating a map indicating a location of an unsuitable point.

FIG. 11 is a flowchart of a process of generating a map indicating a location of an unsuitable point on the basis of collected video data. The process is executed by the judgment unit 2012 at a predetermined time after video data accumulation.

First, in step S21, a set of pieces of video data as a processing object is extracted from the video database 202A. In this step, a set of pieces of video data satisfying the following conditions is extracted.

(1) the condition that a set of pieces of video data correspond to an identical road segment (2) the condition that a set of pieces of video data be one shot within a most recent predetermined period (e.g., from 10 minutes before the current time to the current time)

FIG. 12 is an example of video data extracted in the step. In this example, four sets of pieces of video data are extracted.

Note that, even when vehicles are running in an identical road segment, it is undesirable to compare trajectories of the vehicles if running lanes are different. For this reason, if a target road has a plurality of lanes, an extraction process may be performed for each lane. For example, a vehicle running in the same lane at a time of entry into a road segment and a vehicle running in the same lane at a time of exit may be set as extraction objects.

In step S22, a set which does not include both video data shot by an automated driving vehicle and video data shot by a manual driving vehicle is deleted from extracted sets of pieces of video data. In the example in FIG. 12, a set of pieces of video data corresponding to segment D is set as a deletion object.

Processes in steps S23 and S24 are executed for each of the extracted sets.

In step S23, a trajectory of each probe car is identified on the basis of a plurality of pieces of video data. In this step, as described earlier, a process of extracting a lane line for each of frames included in a vehicle-mounted video is executed, a position (based on a lane) of the probe car is figured out on the basis of a position of the extracted lane line, and a trajectory thereof is identified.

Note that, if two or more automated driving vehicles and two or more manual driving vehicles are included in a target set, the vehicles may be placed into an automated driving vehicle group and a manual driving vehicle group, and a trajectory representing each group may be obtained.

In step S24, the degree of divergence between a trajectory corresponding to an automated driving vehicle and a trajectory corresponding to a manual driving vehicle is calculated, and it is judged whether the calculated degree of divergence is above a threshold.

The degree of divergence may be calculated on the basis of only a geographical position or may be calculated on the basis of both a geographical position and a length of time. In the latter case, even if trajectories are identical, if time periods required for passage are different, the trajectories are regarded as divergent.

If the calculated degree of divergence is above the threshold, the process shifts to step S25. If the calculated degree of divergence is not above the threshold, the process advances to a next set.

In step S25, a judgment on a subject present in a road segment with a divergence is made on the basis of the pieces of video data. The judgment on the subject may be made by pattern matching or the like or may be made using a machine learning model. Note that the subject need not be specifically identified in the judgment. This is because the subject may be identified in a later process, for example, if it is known that the same label is given to the same subject.

Note that, although a judgment on a subject is made using an image in the present example, the judgment on the subject may be made using a different sensor mounted on the probe car 10.

The judgment unit 2012 reflects the calculated degree of divergence and data on the subject obtained by the judgment in the point data 202C. Note that although a subject is specifically identified in the example in FIG. 9, a label representing a result of categorizing the subject may be stored in the subject field.

Figure 13:
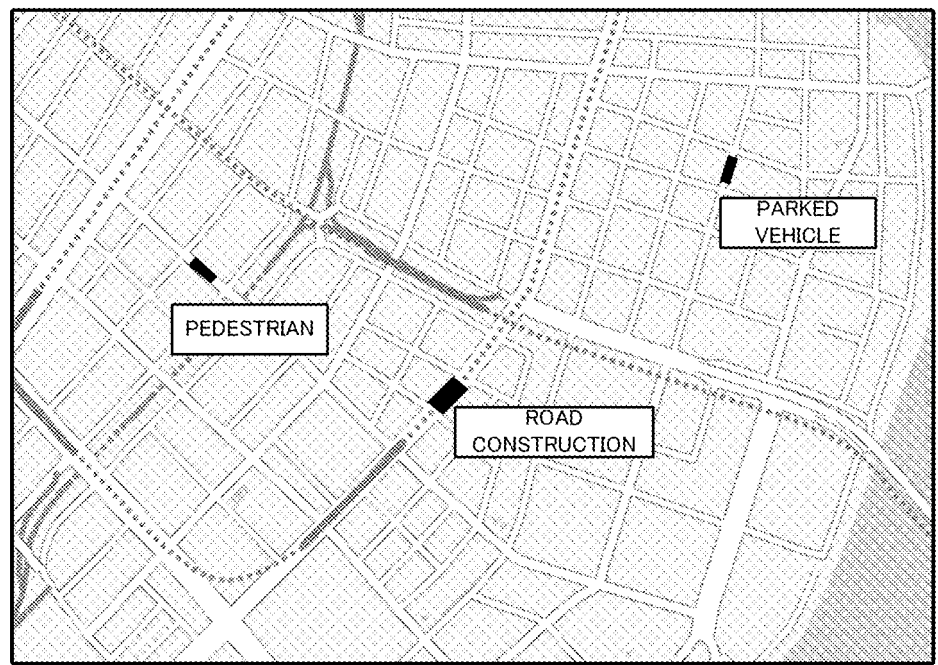
FIG. 13 is an example of map data to be generated by a judgment unit 2012.

In step S26, the judgment unit 2012 generates data (hereinafter referred to as map data) in which an unsuitable point is mapped onto a road map, on the basis of the point data 202C. Information on a point (or a road segment) where the degree of divergence is above the predetermined value and a subject present at the point (road segment) is included in the map data. FIG. 13 is an example of map data to be generated by the judgment unit 2012.

The generated map data is associated with dates and times of shooting of vehicle-mounted videos and is saved in the storage 202.

A process of giving a command for operations to the autonomous vehicle 300 on the basis of generated map data by the server apparatus 200 will be described.

Figure 14:
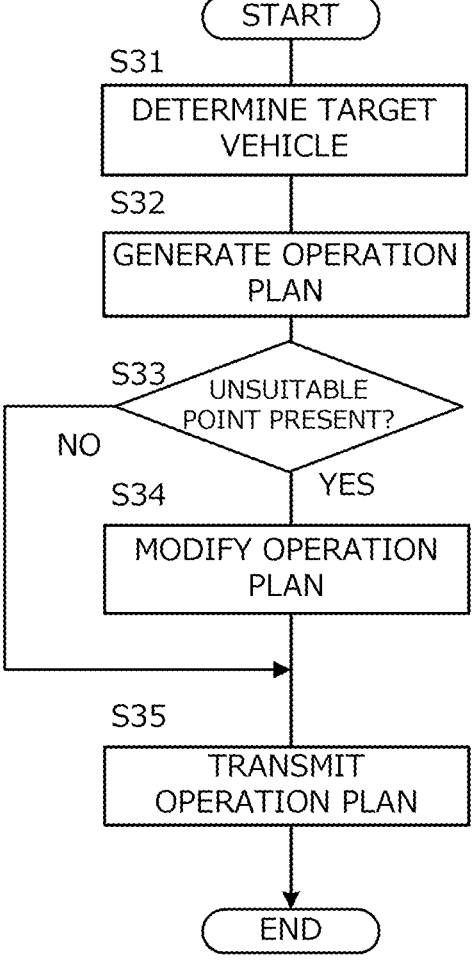
FIG. 14 is a flowchart of a process of giving a command for operations to an autonomous vehicle 300.

FIG. 14 is a flowchart of the process of giving a command for operations to the autonomous vehicle 300 by the server apparatus 200. The illustrated process is executed by the operation command unit 2013 when a trigger for dispatching the autonomous vehicle 300 is pulled. For example, in a case where a transport service is provided by an autonomous vehicle, when a dispatch request is received from a passenger, the illustrated process is started.

In step S31, a vehicle to be dispatched is determined from among a plurality of autonomous vehicles 300 under system control on the basis of a dispatch request or the like. The vehicle to be dispatched can be determined on the basis of, for example, details of a requested service, current positions of the vehicles, and tasks being executed by the vehicles. For example, if the requested service is a passenger transport service, the autonomous vehicle 300 that has a passenger transport function and is capable of arriving at a designated point within a predetermined time period is selected. For this reason, the server apparatus 200 may hold data on a status of the autonomous vehicle 300.

In step S32, an operation plan corresponding to the selected autonomous vehicle 300 is generated. The operation plan is a collection of tasks to be executed by the autonomous vehicle 300. Tasks include, for example, a task of moving to a designated point, a task of picking up and discharging passengers, and a task of loading and unloading baggage. Each task also includes a route along which the autonomous vehicle 300 moves. In the present embodiment, the operation command unit 2013 performs a route search and determines a movement route for the autonomous vehicle 300.

In step S33, it is judged whether the generated route includes an unsuitable point. If the generated route includes an unsuitable point, the process shifts to step S34. If the generated route does not include an unsuitable point, the process shifts to step S35.

In step S34, measures to enhance stability or safety of an autonomous vehicle are taken. In this step, as described earlier, "a process for allowing circumvention of passage through an unsuitable point" and "a process for allowing safe passage through an unsuitable point" can be performed.

In step S35, the generated operation plan is transmitted to the target autonomous vehicle 300.

Figure 15:
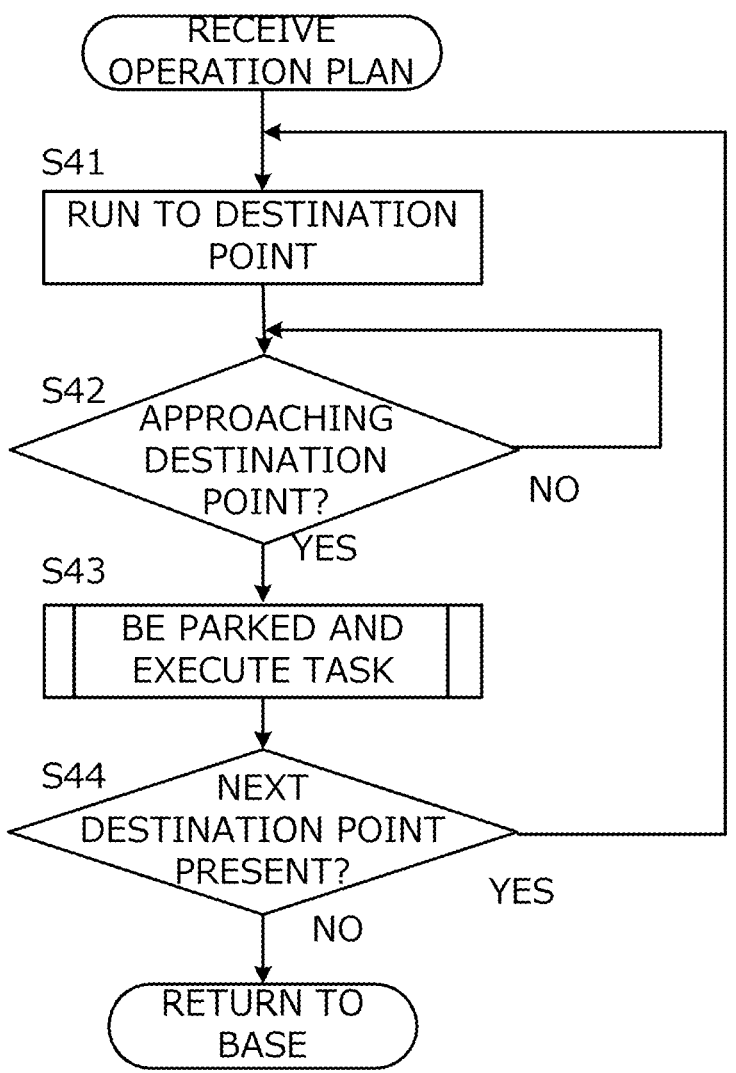
FIG. 15 is a flowchart of a process to be executed by the autonomous vehicle 300.

FIG. 15 is a flowchart of a process to be executed by the autonomous vehicle 300 that is a receiver of an operation plan. The process is started when the autonomous vehicle 300 receives an operation plan from the server apparatus 200.

First, in step S41, running to a destination point (i.e., a point designated by the server apparatus 200) is started in accordance with a designated route.

When the autonomous vehicle 300 approaches the destination point (step S42), the autonomous vehicle 300 searches for a nearby location where the autonomous vehicle 300 can stop and is parked, and executes a task (step S43).

When the task is complete, the autonomous vehicle 300 judges presence or absence of a next destination point in accordance with the operation plan (step S44). If there is a next destination point, the autonomous vehicle 300 continues operation. If there is no next destination point (the tasks included in the operation plan are all completed), the autonomous vehicle 300 returns to a base.

As has been described above, the server apparatus 200 according to the first embodiment identifies a point through which an automated driving vehicle cannot pass smoothly on the basis of vehicle-mounted videos transmitted from the probe cars 10 and makes a judgment on a subject present at the point. The server apparatus 200 also takes measures against an unsuitable point on the basis of a result of the judgment. It is thus possible to circumvent a troublesome situation where an autonomous vehicle cannot run smoothly due to an external environment.

First Modification of First Embodiment

Although the server apparatus 200 generates an operation plan for the autonomous vehicle 300 in the first embodiment, the server apparatus 200 may not generate an operation plan and may only make a judgment on an unsuitable point (and generate map data).

For example, the server apparatus 200 may be configured to distribute only generated map data to the autonomous vehicle 300. In this case, the autonomous vehicle 300 may generate autonomously an appropriate operation plan on the basis of the received map data.

The server apparatus 200 may generate data other than in map form. For example, point data (data in which an unsuitable point and a subject are associated) as illustrated in FIG. 9 may be distributed to a plurality of automated driving vehicles.

The server apparatus 200 may be an apparatus which provides a route search service dedicated to autonomous vehicles. The server apparatus 200 may perform a route search based on an unsuitable point in response to, for example, a request from the autonomous vehicle 300 and return a result of the route search.

Second Modification of First Embodiment

Although an operation plan for the autonomous vehicle 300 is newly generated on the basis of a result of a judgment made by the judgment unit 2012 in the first embodiment, an operation plan for the autonomous vehicle 300 that has already started operation may be modified. For example, if an unsuitable point appears newly, the autonomous vehicle 300 that is scheduled to pass through the unsuitable point may be instructed to change a route so as to circumvent the unsuitable point. Alternatively, if an unsuitable point appears newly, the autonomous vehicle 300 that is scheduled to pass through the unsuitable point may be instructed to interrupt or stop operation. In a case where there is a limit to a running route, such as a case where the autonomous vehicle 300 can run only a route permitted in advance (e.g., a case where the autonomous vehicle 300 is a fixed route bus), the above-described measures can also be taken.

Additionally, notice of resources and the like needed to pass through an unsuitable point may be given to the autonomous vehicle 300. For example, if there is a special obstacle on a route for the autonomous vehicle 300, additional data for recognition of the obstacle may be transmitted to the autonomous vehicle 300.

To perform the above-described processes, the server apparatus 200 may store details of an operation plan transmitted to a plurality of autonomous vehicles 300.

Second Embodiment

In the first embodiment, an autonomous vehicle is controlled on the basis of a result of associating an unsuitable point with a subject. In contrast, a second embodiment is an embodiment which performs scoring for each subject and judges the degree of suitability of a route on the basis of a result of the scoring.

In the second embodiment, a server apparatus 200 stores data (subject data) in which a score is assigned to each subject. FIG. 16 is an example of subject data.

A score according to the present embodiment is a value related to the degree of smoothness of traffic, specifically a value representing the degree to which a subject obstructs traffic. Note that a subject may be subdivided on the basis of a plurality of items (e.g., categories or subcategories). In the illustrated example, different scores are assigned to road construction with lane regulation and road construction without lane regulation.

In the second embodiment, in step S25, a judgment unit 2012 makes a judgment on a subject and calculates a score for the subject that has undergone the judgment on the basis of subject data. FIG. 17 is an example of point data in which a score is given.

In the present embodiment, in step S26, map data associated with a score is generated. Use of such map data allows evaluation of a running route for an autonomous vehicle. For example, summation of scores corresponding to unsuitable points included in a generated running route in a process in step S34 allows calculation of the degree of suitability (or the degree of unsuitability) of the entire route. A judgment on whether to regenerate a route can be made on the basis of this. If the server apparatus 200 is an apparatus which performs a route search, a decision to select a route, a score for which exceeds a predetermined threshold, from among a plurality of route candidates can be made.

(Other Modifications)

The above-described embodiments are merely examples, and the present disclosure can be carried out by being appropriately changed without departing from the scope thereof.

For example, the processes and means described in the present disclosure can be freely combined and carried out as long as there is no technical contradiction.

In the description of the embodiments, the probe car 10 and the autonomous vehicle 300 have been illustrated as separate vehicles. The autonomous vehicle 300 may function as a probe car. Although a probe car which is an automated driving vehicle and a probe car which is a manual driving vehicle are separate vehicles in the description of the embodiments, the both vehicles may be an identical vehicle. That is, an identical probe car may be capable of switching a driving mode.

An additional process may be executed using a result of a judgment on a subject. For example, if it is found that there is some object at a location where a trajectory of an automated driving vehicle is disordered, a corresponding image may be acquired, and a machine learning model may be learned using the image as learning data.

Processing described as being performed by one apparatus may be shared and executed by a plurality of apparatuses. Or alternatively, processing described as being performed by different apparatuses may be executed by one apparatus. In a computer system, what hardware configuration (server configuration) each function is realized by can be flexibly changed.

The present disclosure can be realized by supplying a computer program implemented with the functions described in the above embodiments to a computer, and one or more processors that the computer has reading out and executing the program. Such a computer program may be provided for the computer by a non-transitory computer-readable storage medium connectable to a system bus of the computer or may be provided for the computer via a network. As the non-transitory computer-readable storage medium, for example, a disk of a given type such as a magnetic disk (a Floppy® disk, a hard disk drive (HDD) and the like) and an optical disc (a CD-ROM, a DVD disc, a Blu-ray disc and the like), a read-only memory (ROM), a random-access memory (RAM), an EPROM, an EEPROM, a magnetic card, a flash memory, an optical card, and a medium of a given type that is appropriate for storing electronic commands are included.

What is claimed is:

1. An information processing device comprising a controller configured to execute:
acquiring respective vehicle-mounted videos including an identical road section from a first vehicle that is an automated driving vehicle and a second vehicle that is a manual driving vehicle;
identifying a first running trajectory corresponding to the first vehicle and a second running trajectory corresponding to the second vehicle on the basis of the vehicle-mounted videos;
making a judgment on a subject present at a first point that is a point with a divergence above a predetermined value between the first running trajectory and the second running trajectory;
generating an operation plan for a third vehicle that is an automated driving vehicle, the operation plan including at least a route along which the third vehicle moves;
when the route includes the first point, performing, to the operation plan on the basis of a result of the judgment, a process for allowing circumvention of passage through the first point or a process for allowing safe passage through the first point to modify the operation plan; and
transmitting the modified operation plan to the third vehicle to cause the third vehicle to at least run autonomously in accordance with the modified operation plan, wherein the third vehicle is controlled in accordance with the modified operation plan.

2. The information processing device according to claim 1, wherein
the controller identifies a position of a lane line included in the vehicle-mounted videos.

3. The information processing device according to claim 2, wherein
the controller identifies the first and second running trajectories on the basis of the identified position of the lane line.

4. The information processing device according to claim 1, wherein
the controller makes a judgment on the subject on the basis of an image corresponding to a point of occurrence of the divergence.

5. The information processing device according to claim 4, wherein
the controller calculates a score on a degree of smoothness of traffic for the subject.

6. The information processing device according to claim 5, further comprising
a storage configured to store a category-specific score for each of a plurality of subjects constituting the subject.

7. The information processing device according to claim 5, wherein
the controller associates the calculated score with the first point.

8. The information processing device according to claim 5, wherein
the controller generates a map in which the calculated score is associated with the first point.

9. The information processing device according to claim 8, wherein
the controller modifies the operation plan for the third vehicle on the basis of the generated map.

10. An information processing system including a vehicle-mounted device mounted on an automated driving vehicle or a manual driving vehicle and a server apparatus, wherein the vehicle-mounted device includes
a first controller configured to transmit a vehicle-mounted video shot by a vehicle-mounted camera to the server apparatus, and
the server apparatus includes
a second controller configured to execute:
identifying a first running trajectory corresponding to the automated driving vehicle and a second running trajectory corresponding to the manual driving vehicle on the basis of the vehicle-mounted video including an identical road section;
making a judgment on a subject present at a first point that is a point with a divergence above a predetermined value between the first running trajectory and the second running trajectory;
generating an operation plan for a third vehicle that is an automated driving vehicle, the operation plan including at least a route along which the third vehicle moves;
when the route includes the first point, performing, to the operation plan on the basis of a result of the judgment, a process for allowing circumvention of passage through the first point or a process for allowing safe passage through the first point to modify the operation plan; and
transmitting the modified operation plan to the third vehicle to cause the third vehicle to at least run autonomously in accordance with the modified operation plan, wherein the third vehicle is controlled in accordance with the modified operation plan.

11. The information processing system according to claim 10, wherein
the second controller identifies a position of a lane line included in the vehicle-mounted video.

12. The information processing system according to claim 10, wherein
the second controller makes a judgment on the subject on the basis of an image corresponding to a point of occurrence of the divergence.

13. The information processing system according to claim 12, wherein
the second controller calculates a score on a degree of smoothness of traffic for the subject.

14. The information processing system according to claim 13, wherein
the server apparatus further includes
a storage configured to store a category-specific score for each of a plurality of subjects constituting the subject.

15. The information processing system according to claim 13, wherein
the second controller associates the calculated score with the first point.

16. The information processing system according to claim 13, wherein
the second controller generates a map in which the calculated score is associated with the first point.

\* \* \* \* \*